Patented Mar. 8, 1938

2,110,240

UNITED STATES PATENT OFFICE 2,110,240

PROCESS FOR DESULPHURIZING GASES

Otto Roelen, Mulheim-Ruhr, and Walter Feisst, Oberhausen-Holten, Germany, assignors to Studien- und Verwertungsgesellschaft mit beschränkter Haftung, Mulheim-Ruhr, Germany No Drawing. Application January 23, 1935, Serial No. 3,094. In Germany January 31, 1934

4 Claims. (Cl. 23—3)

Our invention relates to the purification of gases and more especially to the removal of sulphur compounds from gas mixtures and quite particularly from mixtures containing carbon monoxide and hydrogen.

It is known that organic sulphur compounds can be removed from gases containing carbon monoxide and hydrogen by passing the gases over carbonates of the alkaline metals at a high temperature. As the purifying capacity of the substances mentioned, however, remains confined practically to the removal of organic sulphur compounds these substances are of no use for purifying sulphur commercially.

It has been found that it is possible for the sulphur to be completely removed without there being left any trace of newly formed hydrogen sulphide in the gas that is being removed, that is to say, by treating the gases at temperatures of not higher than 300° with alkali carbonates which have been intimately mixed with reactive oxides or hydroxides of iron and constitutes as high a part as approximately 10% or more of this mixture. It has been found that purifying compounds which consist of such mixtures are capable of removing all the sulphur compounds very effectively, so that if the work be carried out properly there is no trace left of sulphur, either in organic combination or as hydrogen sulphide. This reaction was neither known nor could it have been anticipated. Gas purifying compounds known as "alkalized" compounds which contain only a small percentage of alkali and are intended merely for producing an alkaline reaction or for activating the hydrogen sulphide absorbed, do not take part in this reaction. Such a reaction is dependent upon the presence of large quantities of alkali carbonates amounting to at least approximately 10%, calculated on the mixture of alkali metal carbonate and reactive oxide or hydroxide of iron. Alkali carbonate cannot be replaced by carbonates of alkaline earths such as lime, as is the case, for example, when producing "alkalized" gas purifying compounds.

It has been found that intimate mixtures of 1 to 2 parts of soda with 2 to 3 parts of reactive oxides or hydroxides of iron are very effective. For this purpose suitable iron ores such as bog iron ore, as also the residues from the treatment of bauxite, which are generally used as "dry" gas purifying compounds may, for example, be used. For producing the mixtures described it suffices to rub together very intimately in a dry state the two constituents alkali carbonate and iron oxide. This mixture may then be used in the form of powder or in the form of briquettes made from the powder. It is, however, advantageous to bake the mixture that has been stirred with water to produce a stiff paste, by the application of heat, until a solid mass is produced; this is broken up into hard lumps, which retain their shape or mechanical compactness even at the reaction temperature, and notwithstanding this, they can be used effectively for the purifying operation by reason of the great porosity of the whole mass. The shaping and loosening of the mass can be assisted by the use of binders such as waterglass or by other additions such as kieselguhr.

The object of the process according to the invention is to desulphurize those gases which contain carbon monoxide in addition to hydrogen. It is known, however, that iron or iron compounds, particularly when in the presence of alkali, give rise to a catalytic effect in various ways with mixtures of carbon monoxide and hydrogen when at high temperatures. It has been found that notwithstanding this fact, it is possible according to the present invention completely to desulphurize those gases which contain carbon monoxide in addition to hydrogen without undesirable subordinate reactions of the carbon monoxide occurring in the completely desulphurized gas. The mixtures of alkali carbonate and iron oxide produced by the method hereinbefore described, exert a complete desulphurizing action even at considerably lower temperatures than those at which, as experience has shown, the carbon monoxide is catalytically attacked in the same compounds. Accordingly in carrying out the purifying operation according to the present invention the reaction temperatures are maintained so low that complete desulphurization is obtained, and undesirable subordinate reactions do not occur.

According to a known process the desulphurization of gases is effected by the use of alkaline substances or alternatively by the use of oxides and hydroxides of iron and zinc. Temperatures up to 500° C. however must be employed. When using the last mentioned substances with high temperatures destructive subordinate reactions occur when gases containing carbon monoxide are used, whereby the composition of the purifying gas immediately changes. When using the purifying compounds according to the invention, which likewise contain iron oxides and which in the use of considerably lower temperatures effect the complete removal of all the sulphur compounds, in which it differs from the known processes, these otherwise objectionable subordinate reactions of the gas constituents do not occur, so that during desulphurization the composition of the gas treated is not materially changed, that is to say, remains practically unaltered.

With a view to the avoidance of undesirable subordinate reactions desulphurization may be continued at a relatively low temperature for example at between 200° and 230° until the composition is exhausted. Satisfactory purification is possible, however, by the use of substantially lower temperatures such as a temperature of about 100°. A considerable increase in the efficiency of the purifying composition can be obtained however by gradually raising the reaction temperature in the composition up to a maximum of 300°, in the way in which the activity of the mass with reference to the stopping of undesirable subordinate reactions decreases as the proportion of sulphur increases. If on the other hand the desulphurization be carried out under such conditions for example in apparatus suitable for the purpose, that increases in temperature are not possible in the purifying mixture, higher temperatures than 230° may be employed from the outset without any objectionable subordinate reactions.

If the purifying compositions after being used for a correspondingly long period no longer produce a desulphurizing action at the higher temperature, their capacity for absorbing sulphur is not completely exhausted. It has been found that exhausted purifying mixtures after being moistened with water can be still further used for the purpose of removing hydrogen sulphide from the raw gases in known manner at room temperature.

Example

Water gas containing no hydrogen sulphide, but about 30 grammes of organically combined sulphur per 100 cubic metres is conveyed at 230° at a velocity of 500 volumes of gas per hour through a reaction chamber over a purifying composition in small lumps, the composition being produced by the baking and breaking up of 1 part of soda and 2 parts of hydrated iron oxide (Luxmasse) or instead of the latter 2 parts of red slurry ("Rotschlamm"). Under these conditions 1 kg. of the mixture purifies 100 cubic metres of gas so thoroughly that there is no indication when the gas is tested by any of the usual methods that any sulphur remains in any form in the gas, and without the composition of the water-gas being changed.

If the reaction temperature is raised to 300° 1 kg. of the composition purifies as much as 350 cubic metres of gas.

Various changes may be made in the details disclosed in the foregoing specification without departing from the invention or sacrificing the advantages thereof.

We claim:
1. The process of desulphurizing gases containing CO and H, which comprises passing such gases at a temperature ranging between 100° C. and 300° C. in contact with an intimate mixture of a reactive oxide of iron and an alkali metal carbonate, the alkali metal carbonate constituting approximately 10% of the mixture.

2. The process of desulphurizing gases containing CO and H which comprises passing such gases at a temperature ranging between about 100° C. and 300° C. in contact with an intimate mixture containing a reactive oxide of iron and an alkali metal carbonate in the proportion of about 25 to 50% alkali metal carbonate to 75 to 50% oxide of iron.

3. The process of desulphurizing gases containing CO and H, which comprises passing such gases in contact with a mass consisting of a mixture of 1 to 2 parts of alkali metal carbonate with 2 to 3 parts of reactive oxide of iron, and gradually raising the temperature during operation of the process from about 100° C. to about 300° C.

4. The process of desulphurizing gases containing CO and H, which comprises passing such gases in contact with a mass consisting of a mixture of 1 to 2 parts of alkali metal carbonate with 2 to 3 parts of reactive oxide of iron, and gradually raising the temperature during operation of the process from about 230° C. to about 300° C.

OTTO ROELEN.
WALTER FEISST.